(12) United States Patent
Ahn et al.

(10) Patent No.: US 7,715,495 B2
(45) Date of Patent: May 11, 2010

(54) COMMUNICATION SYSTEM, TRANSMITTER, RECEIVER, TRANSMITTING METHOD, RECEIVING METHOD, AND PROGRAM

(75) Inventors: Chang-Jun Ahn, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 270 days.

(21) Appl. No.: 10/585,959

(22) PCT Filed: Jan. 14, 2004

(86) PCT No.: PCT/JP2004/000174

§ 371 (c)(1),
(2), (4) Date: Sep. 18, 2008

(87) PCT Pub. No.: WO2005/069509

PCT Pub. Date: Jul. 28, 2005

(65) Prior Publication Data

US 2009/0034643 A1    Feb. 5, 2009

(51) Int. Cl.
*H04L 27/00* (2006.01)
(52) U.S. Cl. .................................... 375/299
(58) Field of Classification Search ............... 375/260, 375/267, 299, 295
See application file for complete search history.

(56) References Cited

U.S. PATENT DOCUMENTS

2007/0217546 A1* 9/2007 Sandell et al. .............. 375/299

FOREIGN PATENT DOCUMENTS

JP       2001-237757       8/2001

OTHER PUBLICATIONS

Hamalainen et al ("On correlations between dual-polarized base station antennas", Global Telecommunications Conference, 2003. GLOBECOM '03. IEEE Publication Date: Dec. 1-5, 2003 vol. 3, On pp. 1664-1668).*

(Continued)

*Primary Examiner*—David C Payne
*Assistant Examiner*—Leon-Viet Q Nguyen
(74) *Attorney, Agent, or Firm*—Honigman Miller Schwartz and Cohn LLP (57) ABSTRACT

A transmitter 131 in a communication system 101 receives data to be transferred, performs STBC coding thereon to acquire two signals, performs an OFDM transmission process on the signals which are radio-transmitted to from antennas 141, 142 having polarization polarities orthogonal to each other. A receiver 151 radio-receives the signals using antennas 161, 162 having polarization polarities orthogonal to each other, and performs STBC decoding on two signals acquired by performing an OFDM reception process on the received signals, respectively, thereby acquiring the transferred data. The inclinations of the antenna 141 and the antenna 161 are equal to the inclinations of the antenna 142 and the antenna 162, and are typically 45 degrees.

12 Claims, 5 Drawing Sheets

OTHER PUBLICATIONS

Reverse Link Performance Improvement for Dynamic Parameter Controlled OFDM Using Alamouti Coded Heterogeneous Polarization Antennas (The Institute of Electronics, Information and Communication Engineers), Technical Report of IEICE, DSP2003-153, SAT2003-150, RC2003-248(Jan. 2004).

A Simple Theoretical Model for Polarization Diversity Reception in Wireless Mobile Environments, IEEE Antennas and Propagation Society International Symposium, 1999 Digest vol. 2, Jul. 11-16, 1999 Orlando, Florida.

Convolutional Coded Coherent and Differential Unitary Space-Time Modulated OFDM With Bit Interleaving for Multiple Antennas System (The Institute of Electronics, Information and Communication Engineers) Technical Report of IEICE, SST2002-47 (Oct. 2002).

On Extended Alamouti Schemes for Space-Time Coding, Published in the Proceedings of 5th International Symposium on Wireless Personal Multimedia Communications, Oct. 27-30, 2002 Hawaii.

Experimental Results of Cross Polarization Discrimination and Signal Correlation Values for a Polarization Diversity Scheme, 1997 IEEE 47th Vehicular Technology Conference, Phoenix, AZ, May 4-7, 1997.

Space Division Multiplexing (SDM) for OFDM Systems, 2000 IEEE, 51st Vehicular Technology Conference Proceedings, May 15-18, 2000 Tokyo, Japan.

A Simple Transmit Diversity Technique for Wireless Communications, IEEE Journal on Selected Areas in Communications, Oct. 1998, vol. 16, No. 8 (ISSN 0733-8716).

Japanese Office Action dated Jun. 23, 2009.

* cited by examiner

COMMUNICATION SYSTEM, TRANSMITTER, RECEIVER, TRANSMITTING METHOD, RECEIVING METHOD, AND PROGRAM

TECHNICAL FIELD

The present invention relates to a communication system, a transmitter, a receiver, a transmitting method, and a receiving method, which efficiently perform communications using antennas of different polarizations, and a program which allows a computer to realize them.

BACKGROUND ART

There is an increasing demand for a high data rate in wireless communications. As techniques that fulfill such a demand, techniques, such as STBC (Space Time Block Code), OFDM (Orthogonal Frequency Division Multiplexing), and polarization diversity, have been proposed in the following documents.

[Non-patent document 1] A. V Zelst, R. V Nee and G. Awater, Space Division Multiplexing (SDM) for OFDM Systems, Proc. of VTC, pp. 15-18, 2000.

[Non-patent document 2] J. J. A. Lempianen, J. K. Laiho-Steffens, A. Wacker, Experimental results of cross polarization discrimination and signal correction values for a polarization diversity scheme, Proc. of VTC 97, vol. 3, pp. 1498-1502, 1997.

[Non-patent document 3] E. Shin and S. Safavi, A simple theoretical model for polarization diversity reception in wireless mobile environments, proc. of ISAP 99, vol. 2, pp. 1332-1335, 1999.

[Non-patent document 4] Chang-Jun AHN, Iwao Sasase, Convolutional Coded Coheretn and Differential Unitary Space-Time Modulated OFDM with Bit Interleaving for Multiple Antennas system, THE INSTITUTE OF ELECTRONICS, TECHNICAL REPORT OF IEICE, SST 2002-47, pp. 75-80, October 2002.

[Non-patent document 5] S. M. Alamouti, A Simple transmit diversity scheme for wireless communication, IEEE Journal of Sel. Communication, Vol. 19, No. 1, pp. 48-60, January 2001.

[Non-patent document 6] M. Rupp, C. F. Meeklenbrauker, On extended Alamouti Schemes for Space-Time Coding, Proc. of WPMC 2002, Vol. 1, pp. 115-118, October 2002.

Non-patent document 1 discloses an invention relating to the OFDM scheme. Particularly, it shows that the use of a plurality of antennas on both a receiver side and a transmitter side can achieve a high transfer rate on multiple input multiple output (MIMO) channels.

However, various schemes which can achieve faster communications with higher quality are further demanded.

Further, non-patent document 2 discloses a polarization diversity scheme. It is known the XPD (CROSS Polarization discrimination) value for a combination of a horizontal polarization antenna and a vertical polarization antenna varies between 5 dB and 15 dB depending on the environment.

This is the result of measuring the ratio of reception powers in orthogonal diversity branches. When the reception powers of the polarization branches become equal to each other, the maximum diversity gain is achieved.

When the unbalance of reception powers becomes large, however, the diversity gain is not achieved. This is because weak channels are neglected at the stage of coupling diversities.

Non-patent document 3 discloses an ideal model when two antennas of different polarities are used on the transmitter side, two antennas of different polarities are used on the receiver side, and the inclination of one of the receive antennas to one of the transmit antennas is equal to the inclination of the other one of the receive antennas to the other one of the transmit antennas.

Non-patent document 4 is a report on the past research in which one of the inventors of the present invention participated, and discloses an invention which performs unitary space-time modulation and demodulation and generates signals with a time lag provided therebetween using multiple antennas.

Further, non-patent documents 5 and 6 disclose coding and decoding schemes using Alamouti codes that are widely used in the STBC scheme.

The invention has been made to solve various problems of the known systems, and it is an object of the invention to provide a communication system, a transmitter, a receiver, a transmitting method, and a receiving method, which efficiently perform communications using antennas of different polarizations, and a program which allows a computer to realize them.

DISCLOSURE OF INVENTION

To achieve the object, the invention set forth below is disclosed according to the principle of the invention.

A communication system according to the first aspect of the invention comprises a transmitter and a receiver, and is configured as follows.

The transmitter has a modulation unit, a space-time coding unit, a first transmission unit, and a second transmitting unit.

Each of the first transmission unit and the second transmitting unit includes a serial-parallel converting unit, an inverse Fourier transform unit, and a transmitting unit.

The modulation unit modulates data to be transferred.

The space-time coding unit performs space-time coding on a signal originating from the modulation to acquire two signals.

Further, the First Transmission Unit Receives One of the Space-Time Coded Two Signals.

The second transmitting unit receives an other one of the space-time coded two signals.

The serial-parallel converting unit performs serial-parallel conversion of a received signal.

The inverse Fourier transform unit performs inverse Fourier transform on signals originating from the serial-parallel conversion.

The transmitting unit transmits the inverse Fourier transformed signal to an antenna having a predetermined polarization polarity.

A polarization polarity of the antenna used by the first transmission unit (hereinafter "first transmit antenna") is orthogonal to a polarization polarity of the antenna used by the second transmitting unit (hereinafter "second transmit antenna").

The receiver includes a first reception unit, a second reception unit, a space-time decoding unit, and a demodulation unit.

Each of the first reception unit and the second reception unit includes a Fourier transform unit, and a parallel-serial converting unit.

The first reception unit receives and processes a signal transmitted from the transmitter.

The second reception unit receives and processes a signal transmitted from the transmitter.

Further, the space-time decoding unit performs space-time decoding on a signal originating from processing in the first reception unit and a signal originating from processing in the second reception unit to acquire a single signal.

The demodulation unit demodulates the space-time decoded single signal to acquire transferred data.

The receiving unit receives a signal transmitted from the transmitter at an antenna having a predetermined polarization polarity.

Further, the Fourier transform unit performs Fourier transform on the received signal.

The parallel-serial converting unit performs parallel-serial conversion on the Fourier transformed signals to acquire a signal as a processing result.

The polarization polarity of the antenna used by the first reception unit (hereinafter "first receive antenna") is orthogonal to a polarization polarity of the antenna used by the second reception unit (hereinafter "second receive antenna").

Further, an inclination of the first receive antenna to the first transmit antenna is approximately equal to an inclination of the second receive antenna to the second transmit antenna.

The communication system of the invention can be configured in such a way that an inclination of the first receive antenna to the second transmit antenna is approximately equal to an inclination of the second receive antenna to the first transmit antenna.

A transmitter according to another aspect of the invention is a transmitter in the communication system set forth above.

A receiver according to a further aspect of the invention is a receiver in the communication system set forth above.

A transmitting method according to a still further aspect of the invention comprises a modulation step, a space-time coding step, a first transmission step, and a second transmission step.

Each of the first transmission step and the second transmission step includes a serial-parallel converting step, an inverse Fourier transform step, and a transmitting step.

The modulation step modulates data to be transferred.

The space-time coding step performs space-time coding on a signal originating from the modulation to acquire two signals.

The first transmission step receives one of the space-time coded two signals.

The second transmission step receives an other one of the space-time coded two signals.

The serial-parallel converting step performs serial-parallel conversion of a received signal.

The inverse Fourier transform step performs inverse Fourier transform on signals originating from the serial-parallel conversion.

The transmitting step transmits the inverse Fourier transformed signal to an antenna having a predetermined polarization polarity.

A polarization polarity of the antenna used by the first transmission step (hereinafter "first transmit antenna") is orthogonal to a polarization polarity of the antenna used by the second transmission step (hereinafter "second transmit antenna").

The transmitting method of the invention can be configured in such a way that transmission to a receiver which performs reception using two antennas whose polarization polarities are orthogonal to each other (hereinafter one of which is called "first receive antenna" and the other one is called "second receive antenna") is done, and an inclination of the first receive antenna to the first transmit antenna is approximately equal to an inclination of the second receive antenna to the second transmit antenna.

Further, the transmitting method of the invention can be configured in such a way that an inclination of the first receive antenna to the second transmit antenna is approximately equal to an inclination of the second receive antenna to the first transmit antenna.

A receiving method according to a yet still further aspect of the invention comprises a first reception step, a second reception step, a space-time decoding step, and a demodulation step.

The first reception step and the second reception step include a receiving step, a Fourier transform step, and a parallel-serial converting step.

The first reception step receives and processes a signal transmitted from the transmitter.

The second reception step receives and processes a signal transmitted from the transmitter.

Further, the space-time decoding step performs space-time decoding on a signal originating from processing in the first reception step and a signal originating from processing in the second reception step to acquire a single signal.

The demodulation step demodulates the space-time decoded single signal to acquire transferred data.

The receiving step receives a signal transmitted from the transmitter at an antenna having a predetermined polarization polarity.

Further, the Fourier transform step performs Fourier transform on the received signal.

The parallel-serial converting step performs parallel-serial conversion on the Fourier transformed signals to acquire a signal as a processing result.

A polarization polarity of the antenna used by the first reception unit (hereinafter "first receive antenna") is orthogonal to a polarization polarity of the antenna used by the second reception unit (hereinafter "second receive antenna").

The receiving method of the invention can be configured in such a way that reception from a transmitter which performs transmission using two antennas whose polarization polarities are orthogonal to each other (hereinafter one of which is called "first receive antenna" and the other one is called "second receive antenna") is done, and an inclination of the first receive antenna to the first transmit antenna is approximately equal to an inclination of the second receive antenna to the second transmit antenna.

The receiving method of the invention can be configured in such a way that an inclination of the first receive antenna to the second transmit antenna is approximately equal to an inclination of the second receive antenna to the first transmit antenna.

A program according to a further aspect of the invention allows a computer to function as the individual units of the transmitter as set forth above.

A program according to a further aspect of the invention allows a computer to function as the individual units of the receiver as set forth above.

As the program of the invention is run on a computer capable of communicating with other devices can achieve the transmitter, the receiver, the transmitting method and the receiving method of the invention.

An information recording medium recording the program of the invention may be distributed and sold independently of the computer. The program of the invention may be transferred, distributed and sold over a computer network like the Internet.

When the computer has a programmable electronic circuit, such as a DSP (Digital Signal Processor) or an FPGA (Field Programmable Gate Array), particularly, it is possible to use a software radio type scheme of transferring the program of the invention recorded on an information recording medium and allowing the DSP or FPGA in the computer to run the program to achieve the transmitter or the receiver of the invention.

BEST MODE FOR CARRYING OUT THE INVENTION

While a best embodiment to carry out the invention will be described below, the embodiment is illustrated for the purpose of description, and other embodiments according to the principle of the invention are also encompassed in the scope of the invention.

Figure 1:
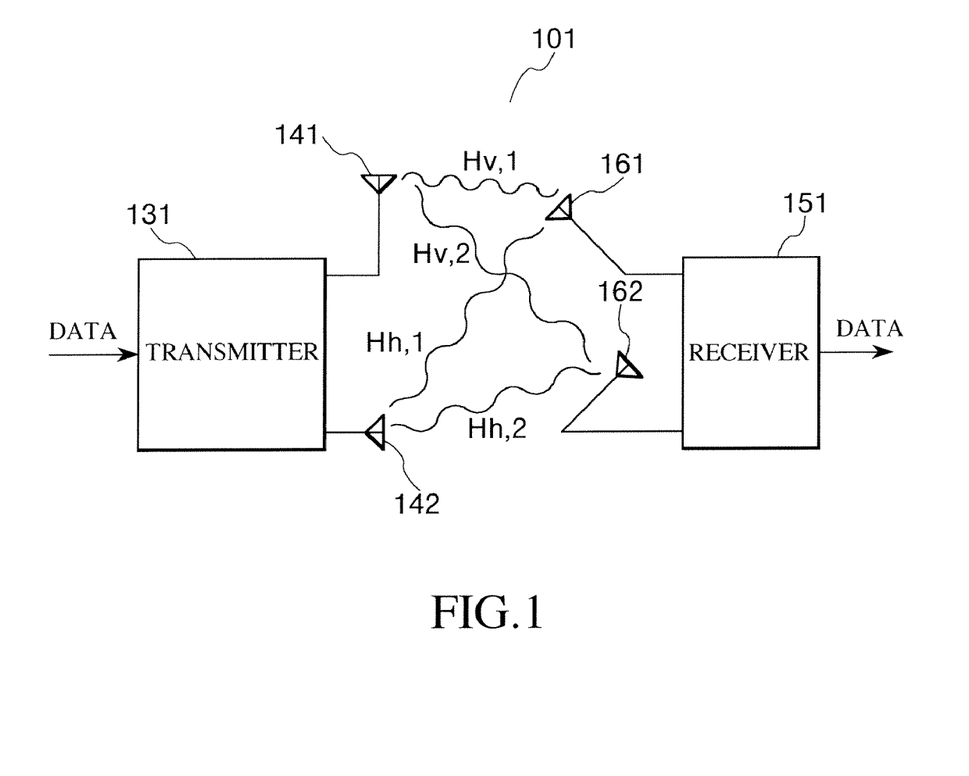
FIG. 1 is an exemplary diagram showing the schematic configuration of a communication apparatus according to one embodiment of the invention.

FIG. 1 is an exemplary diagram showing the schematic configuration of a communication system according to one embodiment of the invention. Description will be given below with reference to the diagram.

A transmitter 131 in a communication system 101 receives data to be transferred, and transmits signals from a first transmit antenna 141 and a second transmit antenna 142. The first transmit antenna 141 and the second transmit antenna 142 are of different polarizations whose polarities are orthogonal to each other; typically, one of the antennas is a horizontal antenna and the other is a vertical antenna.

A receiver 151 receives signals transmitted from the transmitter 131 at a first receive antenna 161 and a second receive antenna 162 to acquire transferred data. The first receive antenna 161 and the second receive antenna 162, which receive, are antennas having predetermined polarities. Typically, the polarization polarities of the first receive antenna 161 and the second receive antenna 162 are orthogonal to each other.

The inclination of the first receive antenna 161 to the first transmit antenna 141 is 45 degrees, and the inclination of the second receive antenna 142 to the second transmit antenna 162 is also 45 degrees. One of the features of the embodiment lies in that the polarity of the transmission side and the polarity of the reception side are arranged non-homogeneously.

The polarity polarization diversity is an attractive scheme in its capability of arranging two antennas at the same location, thus making the apparatus compact. The conventional STBC/OFDM system uses only a vertical polarization antenna, in which case the power of a signal which has a horizontal polarization polarity becomes wasted. When two different polarizations are used on the transmission side, the power of a signal is dispersed to two orthogonal polarities, making it desirable to also arrange antennas of different polarization polarities on the reception side.

The scheme of arranging two antennas homogeneously on the transmission side and the reception side has conventionally been used in polarity transfer diversity, but provides different reception powers on two orthogonal diversity branches. When the unbalance of reception powers becomes large, the contribution of weak channels is neglected at the time of coupling diversities.

According to the embodiment, therefore, two antennas on the transmission side and two antennas on the reception side are arranged heterogeniously to make reception powers respectively received by the two antennas on the reception side equal to each other as much as possible. The scheme disclosed in non-patent document 3 can be adapted to such antenna arrangement.

Figure 2:
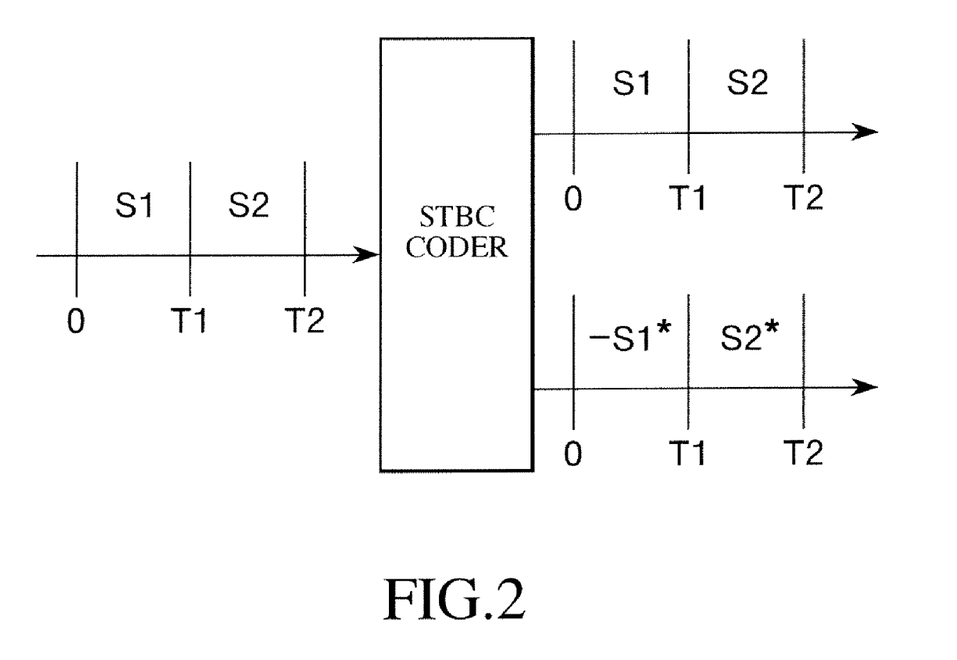
FIG. 2 is an explanatory diagram showing behaviors of STBC codes.

FIG. 2 is an explanatory diagram showing the schematic structure of STBC codes which are used in the invention.

Symbols S1, S2 are input to an STBC coder 201 in order. As each symbol has undergone QPSK coding, it is generally a complex number.

Then, the STBC coder 201 sends two outputs Tx1 and Tx2 symbols

Tx1 . . . S1, S2;

Tx2 . . . S1*, S2*.

The transmitter transmit those symbols from two transmission systems using antennas having different polarization polarities.

The reception side decodes most likely symbols from such signals. An Alamouti coding scheme can be adapted as such a STBC coding scheme.

Turning to FIG. 1, FIG. 1 also shows the relationship among the antennas.

That is, the first transmit antenna 141 and the first receive antenna 161 have a relationship such that the polarization polarities have an inclination of 45 degrees, while the second transmit antenna 142 and the second receive antenna 162 have a relationship such that the polarization polarities have an inclination of 45 degrees.

Let the first transmit antenna 141 be a vertical polarization antenna (v), and the second transmit antenna 142 be a horizontal polarization antenna (h), and let us consider the propagation coefficients of the first receive antenna 161 and the second receive antenna 162 as follows.

$H_{v,1}$ . . . first transmit antenna 141 to first receive antenna 161

$H_{v,2}$ . . . first transmit antenna 141 to second receive antenna 162

$H_{h,1}$ . . . second transmit antenna 142 to first receive antenna 161

$H_{h,2}$ . . . second transmit antenna 142 to second receive antenna 162

Here, let $$A = |H_{v,1}|^2 + |H_{v,2}|^2 + |H_{h,1}|^2 + |H_{h,2}|^2$$

Provided that symbols $S_v$ and $S_h$ are given as data from the transmission side in order, a signal vector to be decoded on the reception side becomes $$(AS_v, AS_h^*).$$

The conventional case of using homogenious polarization polarity antennas differs significantly from the present system in that propagation coefficients of homogeneous antennas, not the aforementioned propagation coefficients, are to be considered.

(Transmitter)

Figure 3:
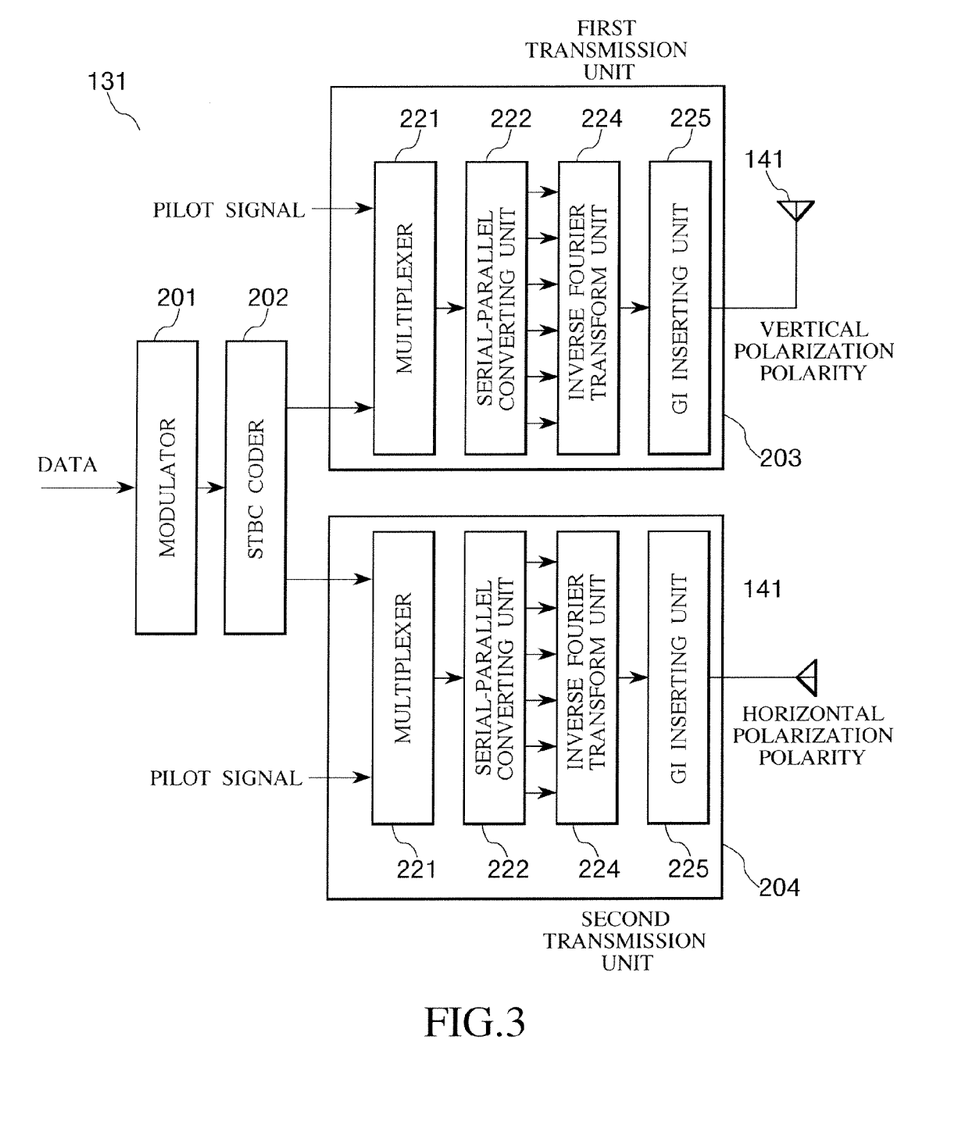
FIG. 3 is an exemplary diagram showing the schematic configuration of a transmitter.

FIG. 3 is an exemplary diagram showing the schematic configuration of the transmitter 131 of the embodiment. Description will be given below with reference to the diagram.

When receiving data to be transferred, the transmitter 131 passes the data to a modulator 201. The modulator 201 performs QPSK demodulation on the data for conversion to complex numbers.

The STBC coder 202 converts the acquired sequence of complex numbers to two code sequences. Here, Alamouti coding is performed as mentioned above.

The two code sequences are respectively given to a first transmission unit 203 and a second transmission unit 204, the former one of which transmits a processed signal from the antenna 141 and the latter one transmits a processed signal from the antenna 142.

The first transmission unit 203 and the second transmission unit 204 have approximately common configurations. That is, an input signal received and a pilot signal are multiplexed by a multiplexer 221. At the time of multiplexing, a scheme of, for example, making the pilot signal of a predetermined number of symbols and the input signal of a predetermined number of symbols into one frame may be available.

Further, a serial-parallel converter 222 performs serial-parallel conversion to multiple channels, an inverse Fourier transform unit 224 performs inverse Fourier transform, then a GI (Guard Interval) inserting unit 225 inserts a guard interval, and the signal is transmitted from the antenna 141 or the antenna 142.

Figure 4:
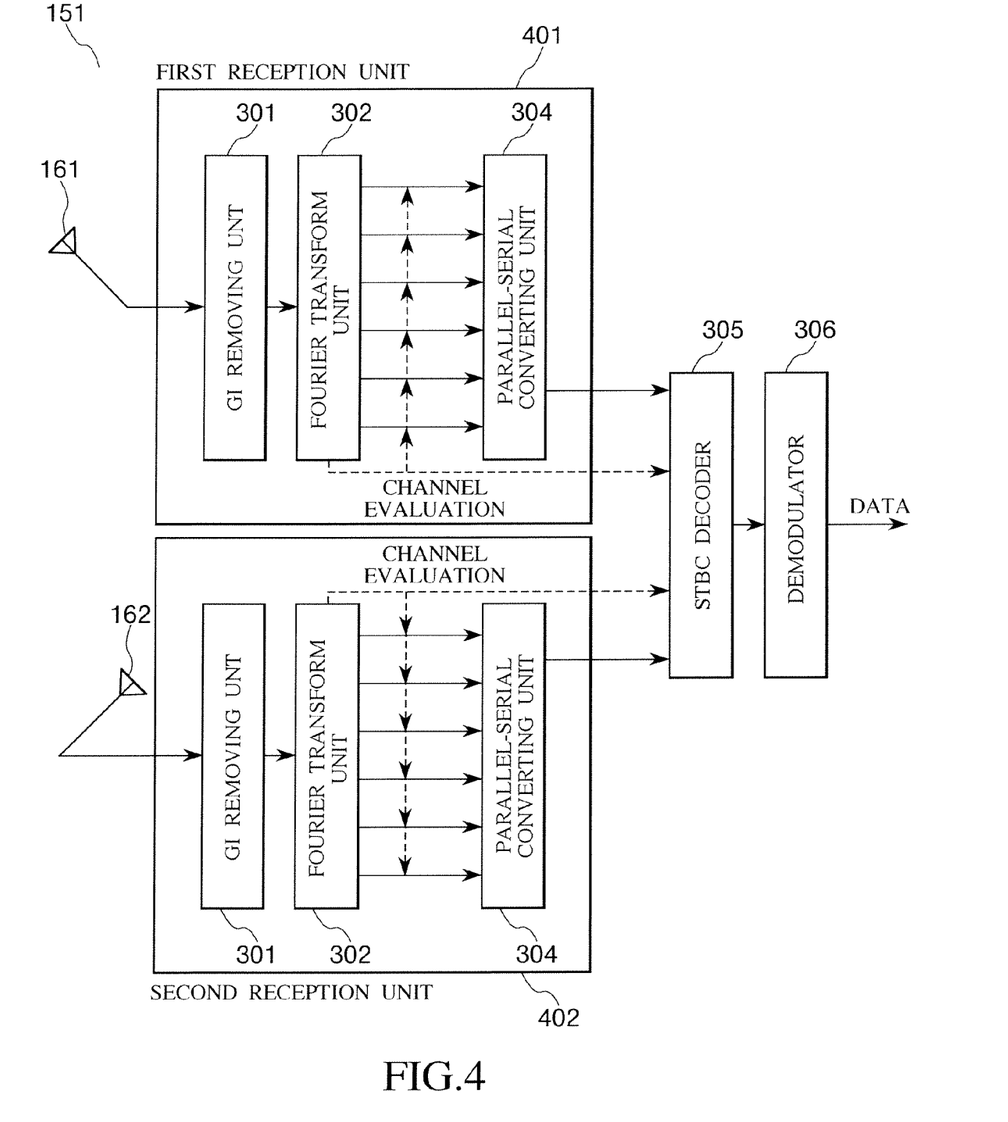
FIG. 4 is an exemplary diagram showing the schematic configuration of a receiver.

FIG. 4 is an exemplary diagram showing the schematic configuration of the receiver 151. Description will be given below with reference to the diagram.

The receiver 151 receives signals transmitted from the transmitter 131 at the two antennas 161 and 162.

The antennas 161, 162 are respectively connected to a first reception unit 401 and a second reception unit 402, which internally perform processes that are approximately the same.

That is, a GI removing unit 301 removes a guard interval, and a Fourier transform unit 302 performs fast Fourier transform to acquire a plurality of signals. A parallel-serial converting unit 304 performs parallel-serial conversion and outputs a single signal.

Signals acquired from the first reception unit 401 and the second reception unit 402 are passed to an STBC decoder 305 which decodes Alamouti codes and outputs a signal.

At this time, as the form of the pilot signal after reception that is actually acquired by the Fourier transform unit 302 is compared with the form of the original pilot signal, the propagation behavior over channels can be evaluated at the time of reception, thus ensuring prediction of the propagation coefficients. The evaluation results are reflected on the output of the Fourier transform unit 302, and are considered in the decoding process in the STBC decoder 305. Various commonly known schemes can be adapted to the channel evaluation.

Finally, as the output of the STBC decoder 305 is QPSK-demodulated in the modulator 306, the transferred data can be acquired.

The use of a scheme, such as software radio, allows the transmitter 131 and the receiver 151 to be realized by providing various computers, FPGAs (Field Programmable Gate Arrays) or DSPs (Digital Signal Processors) with software.

(Experimental Results)

Figure 5:
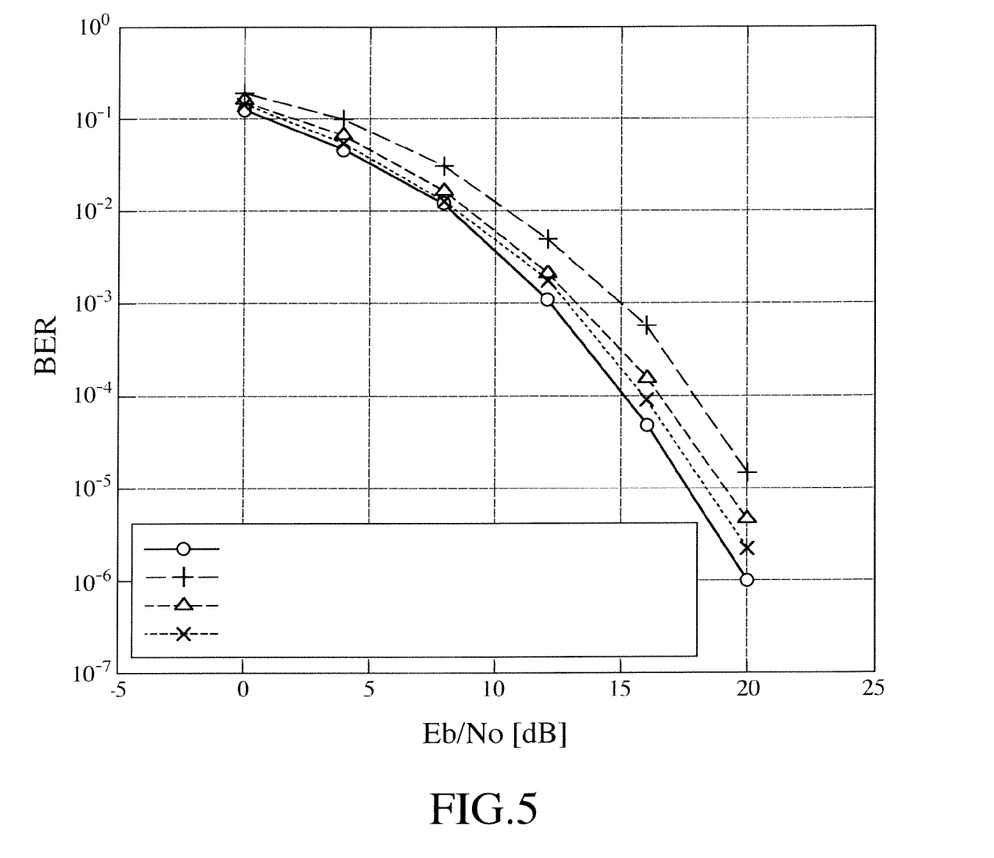
FIG. 5 is a graph showing the results of an experiment conducted in computer simulation.

FIG. 5 is a graph showing the results of studying the performance of the present system on the following data in computer simulation. In the graph, the longitudinal axis represents a BER (Bit Error Rate), and the lateral axis represents an Eb/No value.

data modulation system . . . QPSK
data rate . . . 160 MM symbols/s
frame size . . . 12 symbols (two symbols of pilot and ten symbols of data per frame)
Fourier transform size . . . 1024
the number of carriers . . . 1024
guard interval . . . 256 samples per symbol
effective symbol interval . . . 1024 samples per symbol
fading model . . . 18-path Reilly fading
Doppler frequency . . . 10 Hz
XPD value . . . 5 dB, 10 dB, 15 dB
antenna . . . the transmission side has two horizontal/vertical antennas, and the reception side has a horizontal/vertical antenna or a 45-degree inclined antenna In the diagram, the graph is plotted with white circles indicating the results according to the embodiment, + marks indicating the conventional STBC/OFDM system for the XPD value of 5 dB, white triangles indicating the conventional STBC/OFDM system for the XPD value of 10 dB, and x marks indicating the conventional STBC/OFDM system for the XPD value of 15 dB.

It is apparent from various computer simulations that the performance significantly depends on the XPD value in the conventional schemes, whereas the performance does not change much in the embodiment. It is apparent from the graph that the BER value of the embodiment shows a better performance with respect to any of the conventional schemes.

INDUSTRIAL APPLICABILITY

The invention can provide a communication system, a transmitter, a receiver, a transmitting method, and a receiving method, which efficiently perform communications using antennas of different polarizations, and a program which allows a computer to realize them.

The invention claimed is:

1. A communication system comprising a transmitter and a receiver, (a) the transmitter comprising:
a modulation unit which modulates data to be transferred with QPSK modulation;
a space-time coding unit which performs Alamouti space-time coding on a signal originating from the modulation to acquire two complex signals which are orthogonal to each other;
a first transmission unit which receives one of the space-time coded two complex signals; and
a second transmission unit which receives an other one of the space-time coded two complex signals;
each of the first transmission unit and the second transmission unit including:
a serial-parallel converting unit which performs serial-parallel conversion of a received complex signal;
an inverse Fourier transform unit which performs inverse Fourier transform on signals originating from the serial-parallel conversion; and
a transmitting unit which transmits the inverse Fourier transformed signal to an antenna having a predetermined polarization polarity,
a polarization polarity of the antenna used by the first transmission unit, hereinafter referred as first transmit antenna, being orthogonal to a polarization polarity of the antenna used by the second transmission unit, hereinafter referred as second transmit antenna, (b) the receiver including:
a first reception unit which receives and processes a signal transmitted from the transmitter;
a second reception unit which receives and processes a signal transmitted from the transmitter;

a space-time decoding unit which performs Alamouti space-time decoding on a complex signal originating from processing in the first reception unit and a complex signal originating from processing in the second reception unit to acquire a single signal; and a demodulation unit which demodulates the space-time decoded single signal to acquire transferred data with QPSK demodulation, each of the first reception unit and the second reception unit including:

a receiving unit which receives a signal transmitted from the transmitter at an antenna having a predetermined polarization polarity;

a Fourier transform unit which performs Fourier transform on the received signal; and a parallel-serial converting unit which performs parallel-serial conversion on the Fourier transformed signals to acquire a complex signal as a processing result, a polarization polarity of the antenna used by the first reception unit, hereinafter referred as first receive antenna, being orthogonal to a polarization polarity of the antenna used by the second reception unit, hereinafter referred as second receive antenna, (c) an inclination of the polarization polarity of the first receive antenna to the polarization polarity of the first transmit antenna being approximately equal to an inclination of the polarization polarity of the second receive antenna to the polarization polarity of the second transmit antenna.

2. The communication system according to 1, wherein an inclination of the polarization polarity of the first receive antenna to the polarization polarity of the second transmit antenna is approximately equal to an inclination of the polarization polarity of the second receive antenna to the polarization polarity of the first transmit antenna.

3. A transmitter in the communication system as set forth in claim 1.

4. A receiver in the communication system as set forth in claim 1.

5. A transmitting method comprising:
a modulation step which modulates data to be transferred with QPSK modulation;
a space-time coding step which performs Alamouti space-time coding on a signal originating from the modulation to acquire two complex signals which are orthogonal to each other;
a first transmission step which receives one of the space-time coded two complex signals; and
a second transmission step which receives an other one of the space-time coded two complex signals;
each of the first transmission step and the second transmission step including:
a serial-parallel converting step which performs serial-parallel conversion of a received signal;
an inverse Fourier transform step which performs inverse Fourier transform on signals originating from the serial-parallel conversion; and
a transmitting step which transmits the inverse Fourier transformed signal to an antenna having a predetermined polarization polarity,
a polarization polarity of the antenna used by the first transmission step, hereinafter referred as first transmit antenna, being orthogonal to a polarization polarity of the antenna used by the second transmission step, hereinafter referred as second transmit antenna.

6. The transmitting method according to 5, wherein transmission to a receiver which performs reception using two antennas whose polarization polarities are orthogonal to each other, hereinafter one of which is referred as first receive antenna and the other one is referred as second receive antenna, is done, and an inclination of the polarization polarity of the first receive antenna to the polarization polarity of the first transmit antenna is approximately equal to an inclination of the polarization polarity of the second receive antenna to the polarization polarity of the second transmit antenna.

7. The transmitting method according to 6, wherein an inclination of the polarization polarity of the first receive antenna to the polarization polarity of the second transmit antenna is approximately equal to an inclination of the polarization polarity of the second receive antenna to the polarization polarity of the first transmit antenna.

8. A receiving method comprising:
a first reception step which receives and processes a signal transmitted from the transmitter;
a second reception step which receives and processes a signal transmitted from the transmitter;
a space-time decoding step which performs Alamouti space-time decoding on a signal originating from processing in the first reception step and a signal originating from processing in the second reception step to acquire a single signal; and
a demodulation step which demodulates the space-time decoded single signal to acquire transferred data with QPSK demodulation,
each of the first reception step and the second reception step including:
a receiving step which receives a signal transmitted from the transmitter at an antenna having a predetermined polarization polarity;
a Fourier transform step which performs Fourier transform on the received signal; and
a parallel-serial converting step which performs parallel-serial conversion on the Fourier transformed signals to acquire a signal as a processing result,
a polarization polarity of the antenna used by the first reception unit, hereinafter referred as first receive antenna, being orthogonal to a polarization polarity of the antenna used by the second reception unit, hereinafter referred as second receive antenna.

9. The receiving method according to 8, wherein reception from a transmitter which performs transmission using two antennas whose polarization polarities are orthogonal to each other, hereinafter one of which is referred as first receive antenna and the other one is referred as second receive antenna, is done, and an inclination of the polarization polarity of the first receive antenna to the polarization polarity of the first transmit antenna is approximately equal to an inclination of the polarization polarity of the second receive antenna to the polarization polarity of the second transmit antenna.

10. The receiving method according to 9, wherein an inclination of the polarization polarity of the first receive antenna to the polarization polarity of the second transmit antenna is approximately equal to an inclination of the polarization polarity of the second receive antenna to the polarization polarity of the first transmit antenna.

11. A program which allows a computer to function as the transmitter in the communication system as set forth in claim 1.

12. A program which allows a computer to function as the receiver in the communication system as set forth in claim 1.

* * * * *